United States Patent
Pfeiffer et al.

(10) Patent No.: US 11,140,807 B2
(45) Date of Patent: Oct. 12, 2021

(54) SYSTEM FOR OPTIMIZING AGRICULTURAL MACHINE SETTINGS

(71) Applicant: Deere & Company, Moline, IL (US)

(72) Inventors: Dohn W. Pfeiffer, Bettendorf, IA (US); Sebastian Blank, Bettendorf, IA (US)

(73) Assignee: Deere & Company, Moline, IL (US)

( * ) Notice: Subject to any disclaimer, the term of this patent is extended or adjusted under 35 U.S.C. 154(b) by 804 days.

(21) Appl. No.: 15/698,630

(22) Filed: Sep. 7, 2017

(65) Prior Publication Data

US 2019/0069470 A1 Mar. 7, 2019

(51) Int. Cl.
*A01B 79/00* (2006.01)
*A01D 41/127* (2006.01)
*A01F 12/58* (2006.01)

(52) U.S. Cl.
CPC .......... *A01B 79/005* (2013.01); *A01D 41/127* (2013.01); *A01D 41/1274* (2013.01); *A01D 41/1276* (2013.01); *A01D 41/1277* (2013.01); *A01F 12/58* (2013.01)

(58) Field of Classification Search
CPC ............................ A01B 79/005; A01D 41/127; A01D 41/1274; A01D 41/1277; A01D 41/1276; A01F 12/58
See application file for complete search history.

(56) References Cited

U.S. PATENT DOCUMENTS

| | | | |
|---|---|---|---|
| 5,995,895 A * | 11/1999 | Watt | A01B 79/005 701/50 |
| 6,119,442 A | 9/2000 | Hale | |
| 7,313,478 B1 * | 12/2007 | Anderson | A01B 79/005 702/2 |
| 9,008,918 B2 | 4/2015 | Missotten et al. | |
| 9,226,449 B2 | 1/2016 | Bischoff et al. | |
| 9,485,905 B2 | 11/2016 | Jung et al. | |
| 10,231,380 B2 * | 3/2019 | Heitmann | A01D 41/127 |
| 2008/0306804 A1 * | 12/2008 | Opdycke | G06Q 30/0201 705/14.43 |
| 2014/0215984 A1 * | 8/2014 | Bischoff | A01D 41/127 56/10.2 R |

(Continued)

FOREIGN PATENT DOCUMENTS

| | | |
|---|---|---|
| DE | 19528663 A1 | 2/1997 |
| EP | 2591654 A1 | 5/2013 |

(Continued)

OTHER PUBLICATIONS

EP Search Report issued in counterpart application No. 18189466.8, dated Dec. 11, 2018 (7 pages).

*Primary Examiner* — Mussa A Shaawat

(57) ABSTRACT

A system and method of controlling an agricultural machine includes successively recording signals from a first sensor sensing an agronomic parameter of a field during an operation of the machine in the field. The system and method of controlling an agricultural machine also includes successively recording signals from a second sensor sensing an operation parameter of the machine during the operation of the machine in the field. The signals of the first sensor and the second sensor are spatially overlaid. A respective zone in the field is determined from the overlaid signals. An actuator of the machine is controlled dependent on the determined zone in which the machine operates.

21 Claims, 2 Drawing Sheets

(56) References Cited

U.S. PATENT DOCUMENTS

| | | | | |
|---|---|---|---|---|
| 2016/0066505 | A1* | 3/2016 | Bakke | A01D 41/1274 |
| | | | | 700/275 |
| 2016/0086032 | A1* | 3/2016 | Pickett | G06T 1/0007 |
| | | | | 382/110 |
| 2016/0313151 | A1* | 10/2016 | Duke | G06Q 10/0639 |
| 2016/0330906 | A1 | 11/2016 | Acheson et al. | |
| 2018/0075546 | A1* | 3/2018 | Richt | G06Q 40/08 |
| 2018/0120133 | A1* | 5/2018 | Blank | A01B 63/002 |
| 2018/0122020 | A1* | 5/2018 | Blank | A01D 41/127 |
| 2018/0132422 | A1* | 5/2018 | Hassanzadeh | G06Q 50/02 |
| 2018/0146612 | A1* | 5/2018 | Sauder | G09B 5/02 |

FOREIGN PATENT DOCUMENTS

| | | | |
|---|---|---|---|
| EP | 2622955 | A1 | 8/2013 |
| EP | 3085221 | A1 | 10/2016 |

* cited by examiner

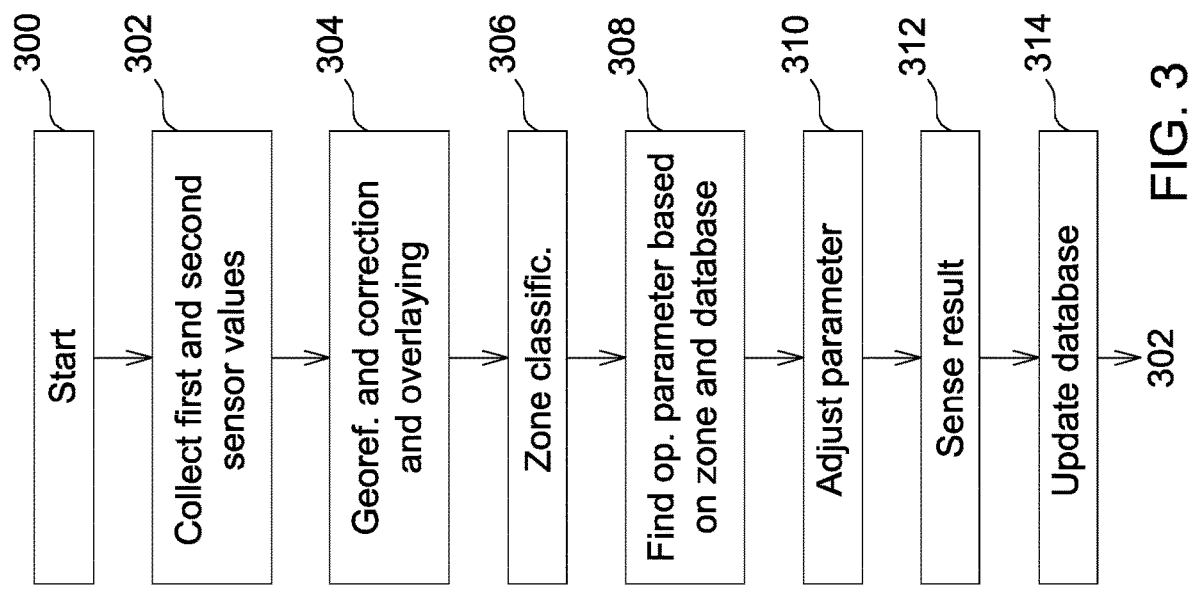
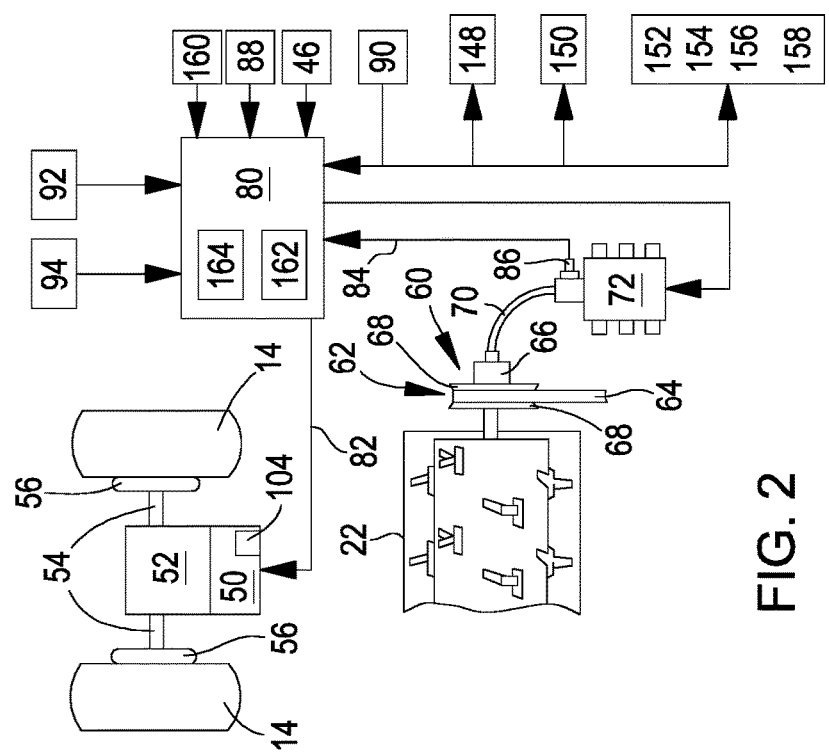

SYSTEM FOR OPTIMIZING AGRICULTURAL MACHINE SETTINGS

This invention relates generally to agricultural machines. More particularly it relates to control of work parameters of the machine.

BACKGROUND

Agricultural machines are used to perform operations on fields, among others seeding, cultivating, fertilizing, spraying and harvesting. Since in many cases, a number of properties of the field vary over the field, like soil composition properties (ingredients), topography (height above sea level and direction of slope) and shadowing by trees, it is useful to adapt certain operating parameters of the agricultural machine to the particular position on which it actually operates in the field. Such operating parameters can be during seeding a seeding depth and an amount of seed per area, during cultivating a working depth or pressure of tillage tools, during fertilizing and spreading, an amount of applied material per area and during harvesting, a propelling speed of the harvesting machine and adjustments of its crop harvesting and/or crop processing means. In case of an agricultural combine, parameters of a threshing, separating and/or cleaning device can be adjusted. This concept of local adaption of machine parameters to a particular position in a field is known in the art as "precision farming". A problem herein is to find appropriate adjustments to the work parameter of the agricultural machine for the respective position on the field.

One approach to find an appropriate work parameter of an agricultural machine is to use a sensor on the machine to evaluate a property of the soil and/or crop at the particulate location and to use the sensor signal for automatic or operator-performed adjustment of the respective work parameter (e.g., U.S. Pat. No. 6,834,484 B2). A disadvantage of this approach is however the reaction time of the sensor and determined zone actuator of the machine, resulting at least at steep changes of field properties in not optimal machine adjustments.

Another approach is to provide a map of the field, for example based on a scouting operation in which properties of the soil and/or crop are sensed and mapped, or during a harvesting operation (GB 2 178 934 A). This can be used for automatic control of the machine based upon its position, which can be determined with a satellite-based positioning system, like GPS, Glonass or Galileo. However, this approach requires a first operation to provide the map.

It was also proposed to base machine parameters on a topographical property of the field, like height above sea level, and to have a first step of operator-based machine control in which a control unit learns a relation between the topographical property and the machine parameter and a second step in which the control unit adjusts the machine parameter automatically based upon the topography of the actual machine position (U.S. Pat. No. 8,738,244 B2). This approach is based upon operator input and does not necessarily require sensors on the machine for detecting crop properties. However, control of the machine based only on a single topographical input parameter is not necessarily resulting in optimal adaption of the machine to the actual conditions and the operator needs to be very experienced to teach the machine optimally. Also, some parameters that an automated system has access to are beyond human recognition due to their nature or due to the frequency so that regardless of skill level the utilization of human operator input can be disadvantageous.

Finally, it was proposed to record properties of the crop, like grain yield, together with machine properties, like operation parameters of a harvesting machine in the field during harvesting and to store these properties assigned to the correct coordinates, i.e. the position where the crop influencing the sensed value has grown (U.S. Pat. No. 5,666,793 A1). Thus, during a following harvesting operation, the machine parameters can be adjusted in a predictive manner. It is also possible to base the machine adjustment only on a partial map of the field based upon the data from one or more adjacent passes over the field, in order to achieve that, despite the reaction time of the actuators, the parameter has already been adapted when for example a fertility border is reached. While the crop properties and machine properties are stored and recalled for determining the machine parameters, it remains unclear how this is done in detail. Thus, the problem still remains that knowledge of an optimal relation between input (crop yield and machine adjustment) and output (machine parameter) needs to be found, which is due to the high number of input parameters hardly possible to find.

It is an object of this invention to provide a control method and system for an agricultural machine avoiding or reducing the mentioned disadvantages of the prior art.

SUMMARY

A method of controlling an agricultural machine comprises (and a system for controlling an agricultural machine includes a control unit programmed to perform) the following steps:
(a) successively recording signals from at least one first sensor sensing at least one agronomic parameter of a field during an operation of the machine in the field,
(b) successively recording signals from at least one second sensor sensing at least one operation parameter of the machine during the operation of the machine in the field,
(c) spatially overlaying the signals of the first sensor and the second sensor,
(d) determining from the overlaid values a respective zone in the field, and
(e) controlling an actuator of the machine dependent on the determined zone in which the machine operates.

In other words, an algorithm and control system are proposed that spatially model sensor data and establish consistent spatial zones of performance and machine settings for predictive control of automated machine settings and ground speed.

BRIEF DESCRIPTION OF THE DRAWINGS

An embodiment is shown in the drawings, in which:
FIG. 2 is a schematic diagram of the system controlling operating parameters of the machine of FIG. 1.
FIG. 3 is a flow diagram according to which the system of FIG. 2 works.

DETAILED DESCRIPTION OF THE DRAWINGS

Figure 1:
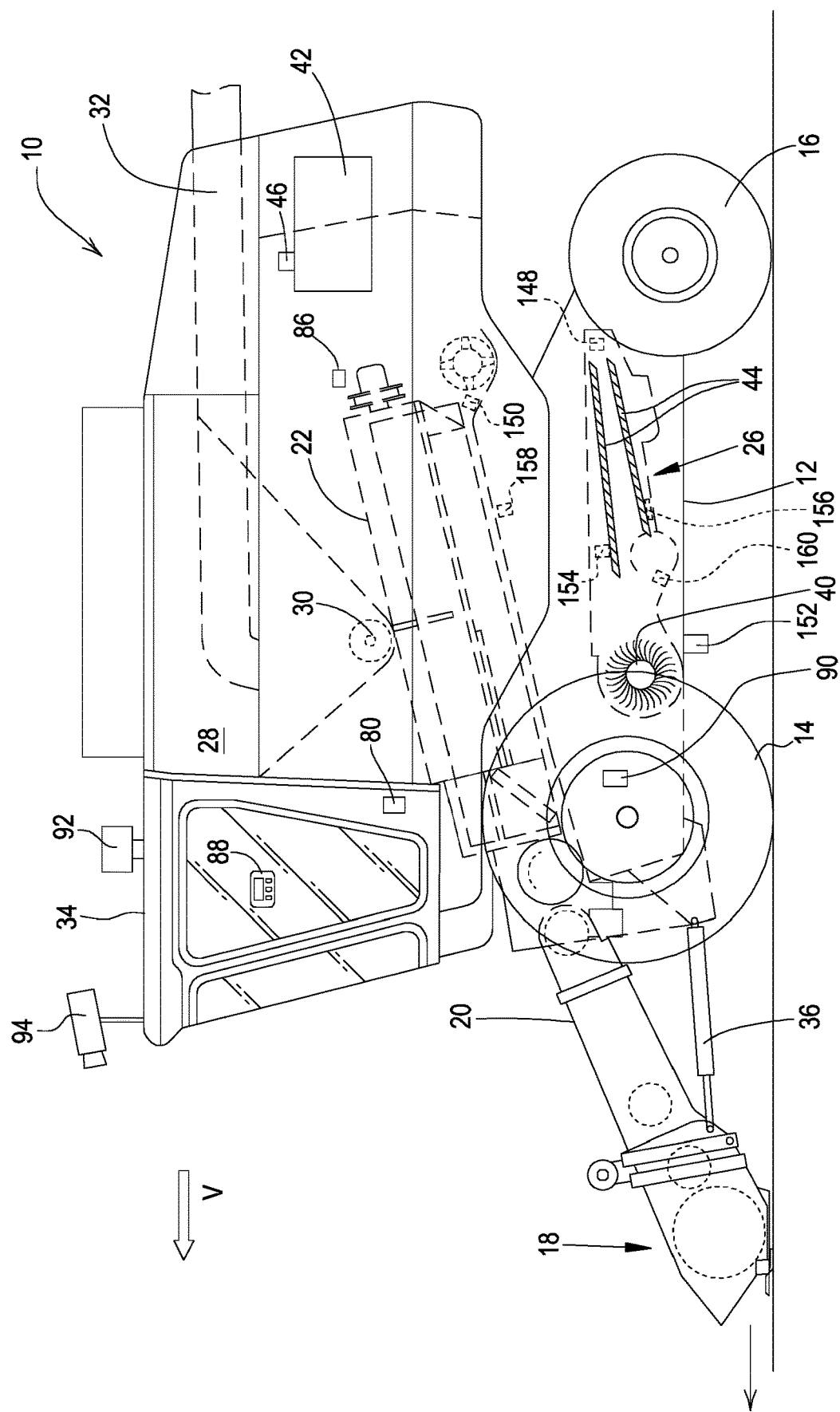
FIG. 1 is a schematical side view of an agricultural machine.

Previous efforts to integrate and automate ground speed and functional machine settings in agricultural machines and in particular harvesting machines primarily rely on temporal control concepts. Transfer functions of empirical relationships or physics based relationships between input data and output sensor and performance data both have a physically defined latency to the sensor signals due to the time required for crop to physically flow through the machine and be sensed and the stability in the sensor signal. Once sensor feedback is provided the control system then actuates changes and the cycle repeats to measure the output response with the mentioned latencies. It is also well known that most fields have high levels of yield and crop characteristic spatial variation which is another challenge to obtain a steady state relationship between inputs and outputs. This typically results in slower filters put on sensor outputs to be able to indicate enough consistency in performance differences to properly trigger settings changes. This results in sub-optimized performance when the agronomic variation varies at a rate faster than the sensing and filtering latency period. It is hence currently difficult for automated machine settings to be able to react to changing spatial variation within typical fields due to limited and imperfect sensors and long data latency filter periods. This results in sub-optimized performance compared to methods that could properly consider known spatial variation and impact on settings based performance.

Other efforts suggest the use of predictive spatial maps to provide a feed-forward input which integrates directly into the traditional temporal control, but require another scouting operation to obtain the map.

The present embodiment makes use of spatially modeled sensor data, predictive sensing of crop characteristics and an integration of spatial and temporal control techniques.

Combines generate agronomic (grain yield, grain moisture, etc.) and machine data (grain loss, power, tailings, etc.) generated during harvest. Spatial yield variation is significant for all crop types and most geographies due to influence from varying soil characteristics, water availability, topography and many other agronomic and environmental characteristics. Grain moisture is also well documented to show varying spatial characteristics influenced by topology, planting date, and other factors. Agronomic harvesting disturbances are also spatially defined and show up in the form of regions of down crop, weed & grass patches, and drowned out areas to name a few examples. Traditional spatial analysis clearly shows the varying levels and zones of each of these agronomic parameters.

Spatial modeling techniques like GAM (generalized additive modeling) can be applied to agronomic and machine data to model the spatial characteristics of each parameter. It would be possible to replace the presently-used operator post calibration of yield or moisture with an algorithm to provide an improved spatial representation with more agronomic consistency. GAM spatial modeling has also been used to statistically calculate the machine to machine agronomic sensing bias that exists when multiple combines are harvesting in the same field to remove stripes in the yield maps and improve overall yield map spatial consistency (U.S. patent application Ser. No. 15/340,704 of 1 Nov. 2016, incorporated by reference herein).

The same GAM technique can also be applied to machine data to model the spatial characteristics of machine data parameters like specific separator power, grain loss (LH shoe, RH shoe, separator, total), tailings volume, and fuel economy. The results within a field indicate extraordinarily high levels of spatial consistency across the mentioned parameter groups. This then provides the opportunity to create a transfer function that associates machines settings to consistent spatial performance levels of the machine which can then be provided as a feed-forward input to the temporal control system and properly consider the reoccurring and unique spatial zones within the field which would not be easy to do with traditional temporal control.

FIG. 1 shows a self-propelled agricultural harvesting machine 10 in the form of a combine, having a supporting chassis 12 that is supported on driven front wheels 14 and steerable rear wheels 16 on the ground and moved forward by the wheels 14, 16. The wheels 14, 16 are set into a rotating motion by drive means shown in FIG. 2 in order to move the harvesting machine 10 over a field to be harvested. In the following, direction references, like forward or rear, refer to the forward direction V of the harvesting machine 10, which is directed towards the left in FIG. 1.

On the front end area of the harvesting machine 10, a header 18 in the form of a platform is removably connected, in order to harvest crop in the form of small grain cereals or other threshable stalk fruit from the field during harvest operation and to convey the harvested crop upwardly and rearwardly through a feederhouse assembly 20 and to an axial processing unit 22 of the harvesting machine 10. The height of the header 18 over ground is controlled by a hydraulic cylinder 36. The axial processing unit 22 is used as a threshing system and separating system in a single unit, but could be replaced with separate units, for example a tangential threshing arrangement and a straw walker. The mixture containing grain and other material penetrating concaves and grates of the axial processing unit 22 reaches a cleaning system 26 with a blower 40 and sieves 44. Grain cleaned by the cleaning system 26 is conveyed by a grain auger to a grain elevator feeding the grain into a grain tank 28. The clean grain in the grain tank 28 can be unloaded by means of an unloader system comprising a transverse auger 30 and an unloader auger 32. The mentioned systems are driven by a combustion engine 42 with an engine control unit and supervised and controlled by an operator from a cab 34 in which an operator interface 88 is provided.

Reference is now made to FIG. 2. The front wheels 14 of the harvesting machine 10 are driven by a hydrostatic transmission 50. The hydrostatic transmission 50 is driven in usual manner by the combustion engine 42. The hydrostatic transmission drives on its end a gearbox 52. Two drive shafts 54 extend from the gearbox 52 to the side and drive end drives 56 of the front wheels 14. The hydrostatic transmission 50 comprises a pump unit and a motor unit, wherein the pump unit could also be located remote from the motor unit. At least one of the pump unit and the motor unit have adjustable swash plates, thus controlling the output speed of the transmission 50 and its rotational direction. Control valves 104 controlled by solenoids adjust the positions of the swash plates. The steerable rear wheels can also be driven by wheel motors directly mounted to the wheels 16. The speed of the wheel motors can also be controlled by the described control system.

An adjustable drive 60 with variable torque drives the rotor of the axial processing unit 22. The combustion engine 42 also driving the hydrostatic transmission 50 drives the adjustable drive 60. The adjustable drive 60 comprises a belt drive with a driving sheave (not shown) having a variable diameter and a driven sheave 62 with variable diameter. A belt 64 extends between the driving sheave and the driven sheave 62 in order to transmit rotational power. An actuator 66 in the form of a hydraulic cylinder controls the diameters of the sheave 62, while another actuator (not shown) can control the diameter of the driving sheave. The actuator 66 is coupled to the driven sheave 62 and moves the front plates 68 of the sheave 62 to the inside or to the outside in order to control the active diameter of the sheave 62 with respect to the belt 64. By changing the active diameter of the sheaves the effective speed of the driven sheave 62 is altered. A hydraulic line 70 submits pressurized hydraulic fluid from a valve assembly 72 to the actuator 66. The rotor of the axial processing unit 22 is driven by the variable-diameter sheaves with a constant, selected rotor speed. The torque transmitted by the belt 64 and the sheaves depends on the crop throughput.

An electronic control unit 80 controls the propelling and thus harvesting speed of the harvesting machine 10. This means that the electronic control unit 80 adjusts the forward (harvesting) speed of the harvesting machine 10 by adjusting the position of the swash plates of the hydrostatic transmission 50 by controlling the operation of the solenoid-controlled valves 104, controlled by the control unit 80 via a line 82. The control unit 80 receives via line 84 an actual hydraulic pressure signal from a hydraulic pressure sensor 86. The hydraulic pressure sensor 86 senses the hydraulic pressure of the actuator 66 which adjusts the variable-torque drive 60. The hydraulic pressure with which the actuator 66 adjusts the drive 60 is in a definite relation to the crop throughput. The control unit 80 is thus provided over line 84 with a signal containing information on the actual crop throughput of the harvesting machine 10. The control unit 80 additionally receives signals from a speed sensor 90 on the actual propelling speed of the harvesting machine 10. The operator interface 88 is also connected to the control unit 88.

Further on, the control unit 88 is connected to a forward-looking crop sensor 94 in the form of a camera mounted on a roof of the cab 34. The forward-looking crop sensor 94 could also be mounted on an UAV and fly at a certain distance in front of the harvesting machine 10 or flying over the entire field before harvesting starts. The crop sensor 94 comprises an image processing system which derives a signal on expected crop throughput to the control unit 88. The control unit 88 is also connected to a position determining system 92 in the form of a GPS antenna, to a first loss sensor 148 sensing the grain loss at the end of the cleaning system 26 and to a second loss sensor 150 sensing the grain loss at the end of the axial processing unit 22.

As described, the control unit 88 is coupled to the valves 104 and thus controls the propelling speed of the harvesting machine. It also controls the valve assembly 72 and thus (via actuator 66) the rotational speed of the rotor of the axial processing unit 22. The control unit 88 also controls a blower actuator 152 controlling the speed of the blower 40, to an upper sieve actuator 154 controlling the opening gap between louvers of the upper sieve 44, to a lower sieve actuator 156 controlling the opening gap between louvers of the lower sieve 44 and to a concave/grate actuator 158 controlling the gap between the rotor of the axial processing unit 22 and a concave and/or a grate assigned to the threshing resp. separating section of the axial processing unit 22. Various other operating parameters of the harvesting machine 10 could be also controlled by the control unit 80, like engine speed via the engine controller 46. Thus, the valves 104 and the actuators 152 to 158 and 66 (the latter controlled by the valve assembly 72) are actuators controlled by the control unit 80 and influence operating parameters of the harvesting machine 10.

It is apparent that the control unit 88 receives crop throughput related signals from the crop sensor 94 and from pressure sensor 86 via line 84. Control unit 88 also receives operation-result dependent signals from the loss sensors 148 and 150 and from a grain quality monitor 160 detecting broken grains and material other than grain (MOG) in the crop stream from the cleaning system 26 to the grain tank 28. Control unit 88 also knows (from suitable feedback sensors) the position of the actuator 104 controlling the propelling speed and of actuators 152-158 and 66 controlling operation parameters (speed of the rotor of the axial processing unit, speed of blower 40, opening sizes of sieves 44 and of concave/grates) of the harvesting machine 10 and thus the respective operation parameters. The control unit 80 comprises a processor 162 and a memory 164.

The crop sensor 94 can, additionally to predict the crop throughput, be adapted to classify down crop and spatial changes in grain yield, and can thus provide a (first) signal representing down crop percentage and orientation, weed patches, grass patches and drowned out areas (voids), as described in U.S. patent application 62/535,043 dated 20 Jul. 2017, the contents of which are incorporated herein by reference. These agronomic disturbance parameters will be generated to be independent of machine form and integrated into the first signal for the control unit 80. This enables a most representative feed-forward dynamic response characteristic that considers the necessary agronomic disturbances.

Thus, the control unit 80 is connected to a first sensor sensing agronomic parameters of the field during operation. The first sensor is in the present embodiment the crop sensor 94 and the pressure sensor 86, since they both sense parameters of the crop (throughput). The position-determination system 92 provides signals on the topography of the field (slope and height over sea level) to the control unit 80, and the machine 10 could be provided with an additional, forward-looking sensor for sensing soil properties (cf. EP 3 195 719 A1). All these sensors can be considered as a first sensor in the sense of the present disclosure.

The control unit 80 is further connected to a number of second sensors sensing an operation parameter of the machine 10. These are the loss sensors 148, 150, the grain quality monitor 160 (which three sense crop-related parameters of the operation result of the harvesting machine 10), the engine controller 46, which is providing the control unit 88 with signals on the operation speed of the engine 42 and the engine torque, and feedback sensors used for sensing the position of the actuator 104 controlling the propelling speed and of the actuators 152-158 and 66 controlling operation parameters (speed of the rotor of the axial processing unit, speed of blower 40, opening sizes of sieves 44 and of concave/grates) of the harvesting machine 10 and thus the respective operation parameters. All these sensors can be considered as a second sensor in the sense of the present disclosure.

During operation, the processor 162 of the control unit 88 proceeds according to the flow diagram of FIG. 3. After start in step 300, the control unit 88 collects the signals from the first sensors (sensors 94, 86) and the signals from the second sensors (sensors 148, 150, 160 and feedback sensors for the positions of the actuators 66, 104, 152-158).

In step 304, these values are georeferenced using the signal from the position determining system 92 and corrected in position and time, since some values are sensed at points in time when the crop harvested at a particular location has run through the harvesting machine 10 for some time (in the order of seconds) until it has reached a sensor or influences its adjustment. Step 304 thus assures that the values from the different sensor at the end correspond to the same location at which the crop influencing the sensor value has grown. In step 304, the physically sensed signals of the first and second sensors can be used as inputs for a model that represents the operation of the harvesting machine 10, as described in U.S. patent application Ser. No. 15/340,704 of 1 Nov. 2016 and DE 10 2017 200 336 A1, the contents of both incorporated by reference herein. Before the sensed signals are used as input for the model, some or all of them can fused (combined) and/or intermediate parameters can be inferred therefrom, e.g. using Bayesian methods. The purpose of the fusion and inference methods applied here resides in two primary areas: (a) correction and/or improvement and/or alignment for existing signals which in particular come from different sensors and/or are sensed at different points of time, and (b) inference across signals to estimate parameters that cannot or are not directly measured. For example, Kalman filters, voting techniques, neural networks and/or Markov models can be used here.

In step 306, the control unit 80 uses the values from step 304 to calculate a zone of the field to which the respective location should be classified. For example, there can be 3 zones for high, medium and low crop yield, or any other number of zones. This zone definition of step 306 makes the subsequently following control steps (308 to 314) simpler since they just have a single input parameter rather than the signals from the various sensors and corresponding control parameters. In step 306, the control unit 80 thus determines or calculates consistent spatial zones.

In step 308, a database in memory 164 is used by the control unit 80 to find one or more operating parameter(s) of actuators of the harvesting machine 10. This database contains operating parameters as a function of the respective zone, which can have been evaluated in previous harvest operations with the same or another harvesting machine and can be continuously updated, as described later. In step 308, the database can comprise a matrix containing the zone, functional settings and derived performance of the machine. In step 308, existing Model Predictive Control (MPC) algorithms can be used to provide the predictive control variable predictions together with the temporal feedback control. In this context, reference is made to DE 10 2017 200 336 A1, the disclosure of which incorporated by reference herein. Step 308 can consider operator preferences that can be input by means of the operator interface 88, for productivity vs. comfort (restriction of machine acceleration) and/or a relative priority of the following control variables: ground speed, grain loss, grain quality and fuel economy.

Thus, the control unit 80 now knows which operating parameter for the various actuators should be used in the following step 310.

In optional step 312, the result of the operation is sensed (by the sensors capable of detecting operation-result dependent signals, e.g., the loss sensors 148 and 150 and the grain quality monitor 160). In optional step 314, the model is updated, since now the control unit 80 has learned whether the adjustments made to the operating parameters had the desired result or not. Thus, in steps 312 and 314 historical and newly generated harvest data are used to build the association between settings and performance by identified zone. Steps 312 and 314 can be done on-board or off board the harvesting machine 10.

Finally, control unit 80 returns to step 302.

The control of the operating parameters of the harvesting machine 10 is hence based on a detected zone of the field in which the harvesting machine is presently working and a database outputting the respective operation parameters dependent on the respective zone. The database can be continuously updated and improved based on sensed results of the adjustments made.

It should be noted that, if the harvesting machine 10 has already harvested a field in a previous year, steps 302 to 306 can be augmented or replaced just by a map of the zones. This map can be generated in step 306 and stored in memory 164 and recalled later using the position-determination system 92. On the other hand, if the harvesting machine 10 traverses the field a first time, there is no such map available. In this case, in order to achieve a reasonable control behavior, the control unit 80 uses the forward-looking crop sensor 94 and/or sensor values from adjacent passes over the field ("pass to pass", where an already harvested pass is used to estimate high level characteristics, e.g. yield changes of an adjacent, not yet harvested pass. This method works even better if passes to both sides have been harvested) to determine the respective zone in steps 302-306, in particular using techniques to spatially smooth previous pass data parameters and extrapolate agronomic and operational zones ahead of cut (cf. DE 195 28 663 A1 and WO 2012/007549 A1). Also, predictive yield map inputs can be used in step 302, as described in DE 10 2005 000 770 B3 and WO 2017/060168 A1, the contents of both incorporated herein by reference.

After all, the described embodiment enables a combination of both temporal and spatial predictive control of ground speed and automated machine settings through the use of a spatial model. A model can be used to take raw sensor data and to provide a useful signal while removing the unwanted noise. A statistical analysis can be performed across the modeled parameters to classify consistent spatial zones of variation. A transfer function can be created between the machine settings and ground speed and the output performance metrics. This spatial transfer function can be provided as a feed-forward input to the temporal control to enable the control system to integrate predictive spatial characteristics into the temporal control and be much more responsive to the known patterns of agronomic variation in a field.

We claim:

1. A method of controlling an agricultural machine, comprising the steps of:
   (a) successively recording signals from at least one first sensor sensing at least one agronomic parameter of a field during an operation of the machine in the field;
   (b) successively recording signals from at least one second sensor sensing at least one operation parameter of the machine during the operation of the machine in the field;
   (c) spatially overlaying the signals of the first sensor and the second sensor;
   (d) determining from the overlaid signals a respective zone in the field; and
   (e) controlling an actuator of the machine dependent on the determined zone in which the machine operates.

2. The method of claim 1, wherein the zone determined in step (d) is stored in a memory in a geo-referenced manner for recalling in a subsequent operation.

3. The method of claim 1, wherein an intermediate parameter is inferred from the signals of at least one of the first sensor and the second sensor before overlaying.

4. The method of claim 1, wherein in step (e) the actuator is adjusted in a predictive manner such that once the machine reaches a particular zone in the field, the actuator has already been adjusted for the particular zone.

5. The method of claim 1, wherein in step (d) the respective zone is determined considering the signals from at least one of the first sensor and the second sensor for a location adjacent to the machine that has been previously passed by the machine.

6. The method of claim 1, wherein the first sensor is adapted to sense at least one of a soil parameter of the field, a topography parameter of the field and a crop parameter of crop in the field.

7. The method of claim 1, wherein the second sensor is adapted to sense at least one of an operating parameter of the machine and a value influenced by the operation of the machine.

8. The method of claim 1, wherein the agricultural machine is a combine and the actuator is adapted to adjust at least one of a propelling speed and a work parameter of a threshing system, a work parameter of a separating system and a work parameter of a cleaning system.

9. The method of claim 8, wherein the second sensor is adapted to sense at least one of a power consumption of the machine and a grain loss of the machine.

10. The method of claim 1, wherein a control system is programmed to use a model predictive control algorithm in step (e).

11. A control system of an agricultural machine, comprising a control unit programmed to:
  (a) successively record signals from at least one first sensor sensing at least one agronomic parameter of a field during an operation of the machine in the field;
  (b) successively record signals from at least one second sensor sensing at least one operation parameter of the machine during the operation of the machine in the field;
  (c) spatially overlay the signals of the first sensor and the second sensor;
  (d) determine from the overlaid signals a respective zone in the field; and
  (e) control an actuator of the machine dependent on the determined zone in which the machine operates.

12. The control system of claim 11, wherein the control unit is programmed to store the zone determined in step (d) in a memory in a geo-referenced manner for recalling in a subsequent operation.

13. The control system of claim 11, wherein the control unit is programmed to infer an intermediate parameter from the signals of at least one of the first sensor and the second sensor before overlaying.

14. The control system of claim 11, wherein the control unit is programmed to adjust in step (e) the actuator in a predictive manner such that once the machine reaches a particular zone in the field, the actuator has already been adjusted for the particular zone.

15. The control system of claim 11, wherein the control unit is programmed to determine in step (d) the respective zone considering the signals from at least one of the first sensor and the second sensor for a location adjacent to the machine that has been previously passed by the machine.

16. The control system of claim 11, wherein the first sensor is adapted to sense at least one of a soil parameter of the field, a topography parameter of the field and a crop parameter of crop in the field.

17. The control system of claim 11, wherein the second sensor is adapted to sense at least one of an operating parameter of the machine and a value influenced by the operation of the machine.

18. The control system of claim 11, wherein the agricultural machine is a combine and the actuator is adapted to adjust at least one of a propelling speed and a work parameter of a threshing system, a work parameter of a separating system and a work parameter of a cleaning system.

19. The control system of claim 18, wherein the second sensor is adapted to sense at least one of a power consumption of the machine and a grain loss of the machine.

20. The control system of claim 11, wherein the control unit is programmed to use a model predictive control algorithm in step (e).

21. An agricultural machine with a control system according to claim 11.

* * * * *